May 31, 1932.　　　R. J. DICKEY　　　1,861,427
SHOCK ABSORBER
Filed Oct. 12, 1928　　2 Sheets-Sheet 1
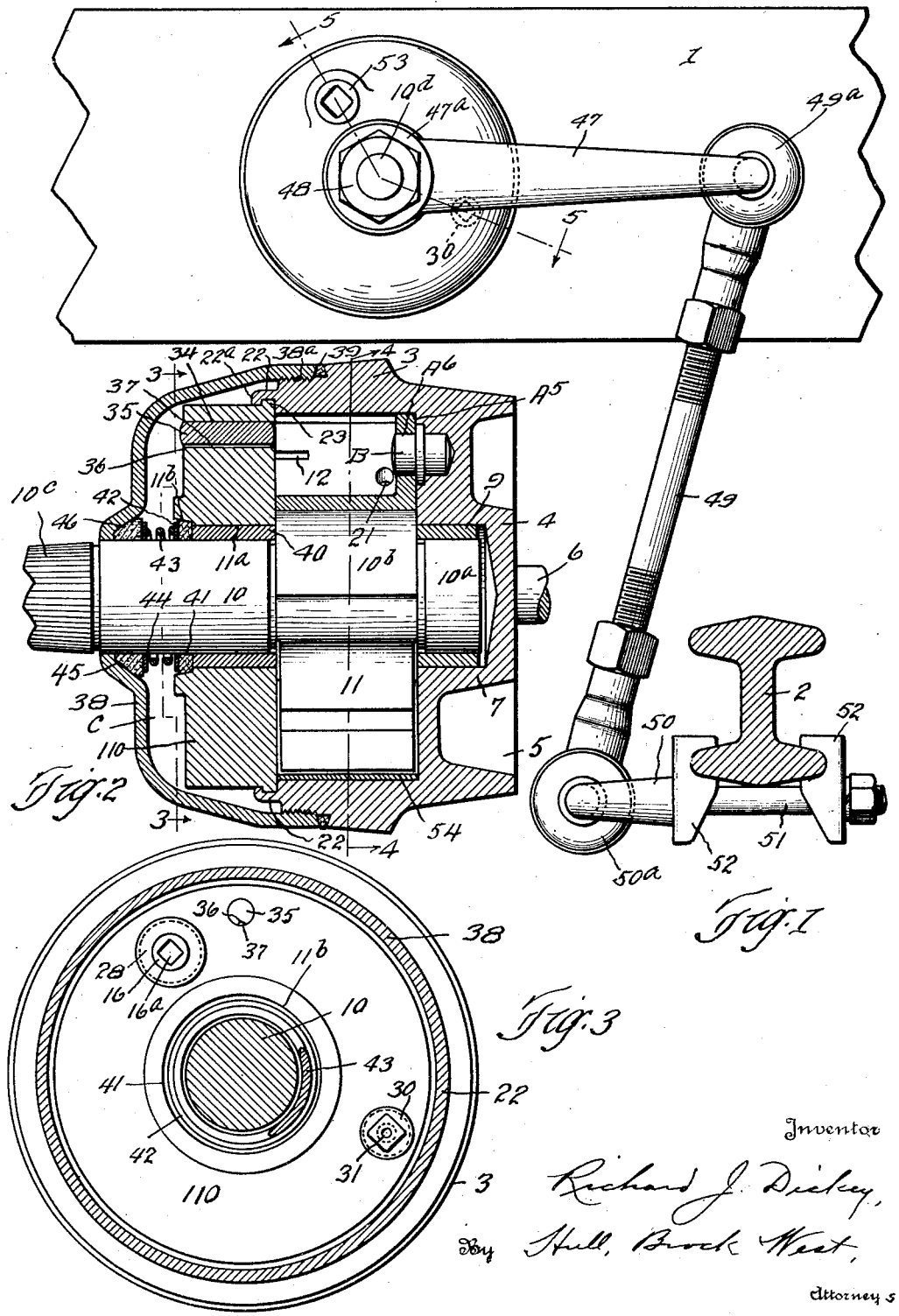
Inventor
Richard J. Dickey,
By Hull, Brock West,
Attorneys May 31, 1932.  R. J. DICKEY  1,861,427
SHOCK ABSORBER
Filed Oct. 12, 1928  2 Sheets-Sheet 2

Inventor
Richard J. Dickey,
Hull, Brock & West.
By
Attorneys

Patented May 31, 1932

1,861,427

UNITED STATES PATENT OFFICE

RICHARD J. DICKEY, OF CLEVELAND HEIGHTS, OHIO, ASSIGNOR TO THE GABRIEL COMPANY, OF CLEVELAND, OHIO, A CORPORATION OF OHIO

SHOCK ABSORBER

Application filed October 12, 1928. Serial No. 312,000.

This invention relates to shock absorbers of the hydraulic type, and has for its general object to simplify and improve the construction and promote the efficiency of devices of this character.

Figure 4:
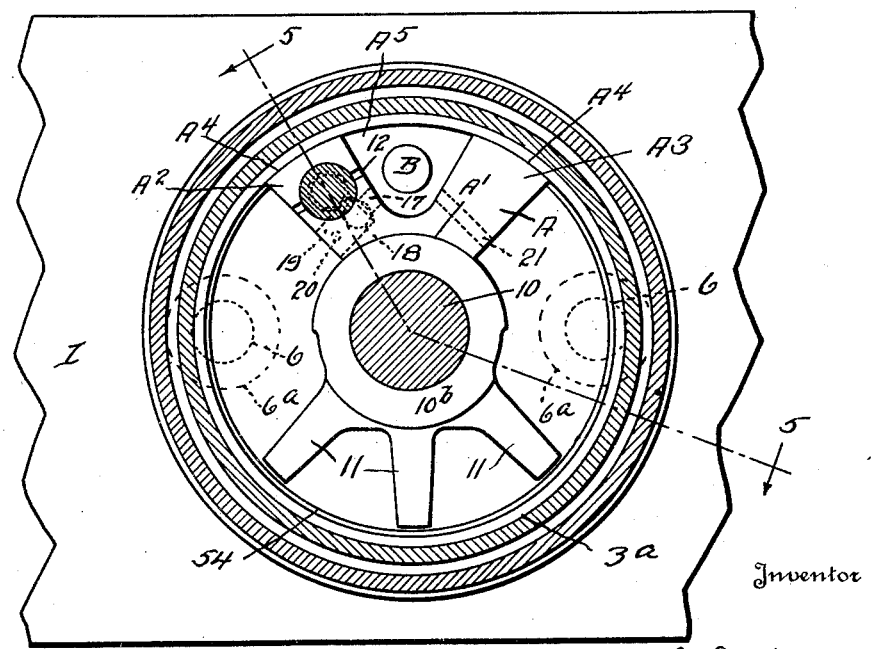

Further and more limited objects of the invention will appear hereinafter and will be realized in and through the construction and arrangement of parts set forth in the claims and illustrated in the drawings wherein Fig. 1 represents a side elevation of part of a vehicle and a cross sectional view through the axle of such vehicle showing the manner of applying my shock absorber thereto; Fig. 2 is a detail in longitudinal section through the shock absorber proper; Fig. 3 a cross sectional view corresponding to the line 3—3 of Fig. 2; Fig. 4 a cross sectional view taken between the cover block and the working chamber and looking toward the latter; and Fig. 5 a longitudinal sectional view through the shock absorber corresponding substantially to the line 5—5 of Figs. 1 and 4, but showing a slight modification in the means for connecting the cover block with the casing.

Describing the various parts by reference characters, 1 denotes one of the side members and 2 the axle of an automobile. The shock absorber comprises, generally, a substantially cylindrical casing 3 formed with a bottom 4 provided with a peripheral flange 5 which engages the side member 1 and to which the base is secured by means of bolts 6 extending through the member 1 and threaded into bosses $6^a$ carried by the bottom. The casing bottom is provided with a central boss 7 having an inner cylindrical seat 8 for an antifriction bushing 9 in which the inner end $10^a$ of the shaft 10 is journaled. The shaft 10 is provided within the casing 3 with an enlarged intermediate portion $10^b$, the portion $10^b$ being coextensive in length with the depth of the liquid chamber provided between the bottom of the casing and the cover block 110 therefor. Projecting from the intermediate portion $10^b$ of the shaft are the vane members 11, three such members being shown. The outer ends of these vane members are in close proximity to the inner cylindrical wall $3^a$ of the casing.

Diametrically opposite the central vane member, as shown in Fig. 4, is the valve assembly, said assembly comprising generally a substantially V-shaped mounting indicated at A and having its apex curved, as shown at A', to form a close fit with the cylindrical portion $10^b$ of the shaft and having also legs $A^2$ and $A^3$ provided each with a segmental outer bearing surface $A^4$ adapted to engage the inner cylindrical wall $3^a$ of the casing. The assembly is secured within the casing 3 by means of a flange $A^5$ intermediate the legs $A^2$, $A^3$, which flange bears against the inner face and the bottom 4 and is provided with an aperture $A^6$ which receives one end of a dowel pin B, the opposite end of the pin being anchored in the bottom 4 of the casing.

Figure 5:
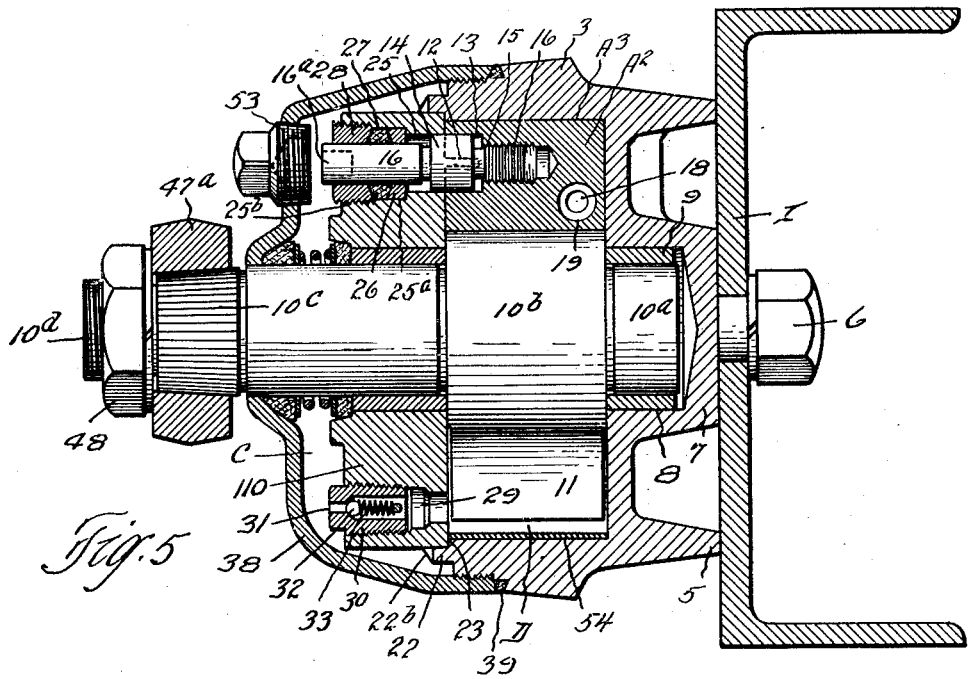

The leg $A^2$ is provided with a through port 12 which is intersected by a cylindrical bore 13. This port 12, as will appear from Fig. 5, is elongated in the direction of the length of said bore and is arranged to be covered more or less by the cylindrical body 14 of a valve, the said body fitting the bore 13 and being provided with a reduced end 15 which is threaded into a bore 16 provided therefor in the leg $A^2$. The valve is provided with a stem 16 having a socket $16^a$ in the outer end thereof for the reception of a suitable tool, by means of which the valve may be rotated.

In addition to the port 12, the leg $A^2$ is provided with a port 17 which port is controlled by a ball check valve 18 operating in a chamber 19 at one end of said bore, the ball being retained in said chamber by a pin 20.

The leg $A^3$ is provided with a through port 21. By this arrangement of ports and valves in the legs $A^2$ and $A^3$, the resistance to the movement of the rotation of the shaft in a counter-clockwise direction will be determined by the port 21, the valve 18 opening to provide a free passage through the port 17, 19, when the shaft is rotating in such direction. However, when the shaft rotates in the opposite direction, the valve 18 is closed, and the port 12 determines the resistance which the liquid shall afford to the movement of the shaft in this direction, the port 21 being of greater cross-sectional area than the port 12.

The cylinder body 3 is provided with a flange 22 extending outwardly from the said body and surrounding an annular seat on the outer end of said body for the cover block 110, which block in Fig. 2 is shown as secured in place by means of an annular shoulder 23 on the base of the cover block which is engaged by the inwardly rolled outer portion $22^a$ of the flange 22. On Fig. 5, the cover block is secured to the cylinder body 3 by welding the outer end of the flange 22 to said block, as indicated at $22^b$.

The cover block is provided with a bore 25 forming a continuation of the bore 13 and with an enlarged bore $25^a$ beyond the bore 25, the outer end of the bore $25^a$ being threaded, as shown at $25^b$. The valve stem 16 extends through a steel packing gland 26 in the inner end of the bore $25^a$; through a packing ring 27, the said ring preferably being made from a composition of rubber and canvas, and through a plug 28 which is threaded into the outer end of the bore $25^a$. The outer end of the valve stem projects beyond the said plug in position to enable its socket to receive a suitable tool for rotating the same and thereby controlling the effective area of the port 12.

The cover block 11 is also provided with a port 29 into which is inserted a hollow plug 30, the said plug having a port 31 through the outer end thereof which is adapted to communicate with the interior of said plug and with the port 29, the port 31 being provided with a ball valve 32 normally held to its seat by a spring 33. This permits liquid from a reserve chamber C to be drawn into the operating chamber D of the cylinder 3, but prevents the liquid from passing in the reverse direction.

The cover block 11 is provided in the upper portion thereof with a bore 34 in which is driven a pin 35 having a groove 36 extending lengthwise thereof and providing, with the said bore, a port 37 which places the upper portions of the chambers C and D in communication with each other, thereby permitting the escape of air from the upper end of the chamber D to the reserve chamber.

The reserve chamber C is conveniently formed between the outer face of the casing 3, the cover block 11, and a cover shell 38 which is threaded onto the casing 3 at $38^a$, the extreme end of the cover shell being electrically welded to the casing, as shown at 39.

Within the central opening $11^a$ of the cover block there is inserted a bronze bushing 40 for the shaft 10. At the outer end of the central opening $11^a$ a tapered annular seat $11^b$ is provided for a packing ring 41, which ring may be conveniently formed of a composition of rubber and canvas. To the outer face of this packing ring is applied a washer 42 against which one end of a helical spring 43 bears, the outer end bearing against a washer 44 which in turn bears against a packing ring 45, which is preferably of the same material as the packing ring 41. The packing ring 45 fits into a tapered seat 46 in the cover 38. Due to the shape of the seats 11 and 46, the packing rings 41 and 45 are compacted against the shaft 10 by the action of the spring 43.

The shaft 10 is provided with a tapered outer end $10^c$ for the hub $47^a$ of an arm 47, the hub being held in place by means of a nut 48 threaded upon the outer end $10^d$ of said shaft. The arm 47 is connected by a connecting rod or drag link 49 to a bracket 50 projecting from one end of a bolt 51 which secures a pair of clamps 52 to the axle 2. The outer end of the arm 47 is connected to the upper end of the rod 49 by means of a ball-and-socket connection, indicated generally at $49^a$, and the lower end of the rod 49 is connected in like manner to the outer end of the bracket 50, as indicated at $50^a$. The particular manner of connecting the arm 47 to the axle 2 forms no part of the invention covered herein; hence a detailed description of such connection is unnecessary.

From the foregoing description, it is believed that the operation of the device will be readily understood. On a movement of the shaft 10 in a counter-clockwise direction, liquid will be forced by the blades or vanes 11 through the port 21 and freely through the port 17 to the outlet side of the vanes, the port 21 determining the resistance to the movement of the vanes. Any deficiency in liquid in the space between the leg $A^2$ and the vane nearest thereto will be made good by liquid supplied from the chamber C through the port 31, the suction stroke of the vanes operating to draw liquid through said port from the reserve chamber.

A movement of the vanes and shaft in a clockwise direction will be resisted by the port 12; and the resistance which this port will oppose to such movement of the vanes and shaft will be determined by adjusting the valve 14.

In order to afford a means for filling the chamber C and to provide access to the valve stem 16, the cover 38 is provided with an opening in line with the said stem, which opening is closed by a screw threaded plug 53. Any air that may tend to accumulate in the upper portion of the chamber D will be forced therefrom into the reserve chamber C, through the air vent port 37.

The casing 3 and the vanes 11 are preferably of steel. In order to reduce to a minimum any danger of scoring or otherwise injuring the interior of the casing by the outer ends of said vanes, it is preferred to provide the casing with a liner 54 of brass, the said liner fitting closely within the cylindrical wall of the casing and extending from one of the legs A² to the other leg A³.

The shock absorber described herein is of marked efficiency and is comparatively simple and inexpensive of production. The construction of the cover block 11 and of the cover 38 is such that an effective stuffing box is provided between and in connection with these parts for the shaft 10; and an efficient packing is provided for the valve stem 16, so as to reduce to a minimum any leakage around the stem and into the chamber C at the time when the seepage port 12 is functioning.

Having thus described my invention, what I claim is:—

1. A shock absorber comprising a liquid-containing casing, a shaft journaled in said casing, a vane on said shaft, and a valve mounting extending between said shaft and the inner wall of the casing, the said mounting comprising a pair of legs extending between the shaft-engaging portion of said mounting and the casing, each of said legs being provided with a port therethrough, a check valve controlling the port in one of said legs and adapted to permit the free flow of liquid therethrough by a movement of the vane in one direction while closing the said port by a movement of the vane in the opposite direction, the leg having such check valve being provided with another port therethrough, and a valve for controlling the effective cross-sectional area of the last-mentioned port.

2. A shock absorber comprising a liquid-containing casing, a shaft journaled in said casing, a vane on said shaft, a valve mounting extending between said shaft and the inner wall of the casing, the said mounting comprising a pair of legs extending between the shaft engaging portion of said mounting and the casing, one of said legs being provided with a port therethrough, the other leg having a port therethrough provided with a check valve adapted to permit a free flow through such port of the liquid passing through the first mentioned port but to prevent the flow of liquid through such second port by a movement of the vane in the reverse direction, the second leg being provided also with another through port and with a valve for controlling the effective cross sectional area of such port.

3. A shock absorber comprising a casing having a cylindrical chamber, a shaft journaled in the bottom of said casing, a vane on said shaft, and a partition extending between said shaft and the said casing, a cover block for said casing, the said cover block having a central aperture therethrough for the shaft, a bushing in said aperture surrounding said shaft, a packing ring within the outer end of the aperture and surrounding said shaft, a cover secured at one end to the said casing and forming with the cover block a reserve chamber and provided with a central opening for the said shaft and with an annular seat within the reserve chamber at the inner end of the said opening, a packing ring in said seat, a spring surrounding the said shaft and pressing the said packing rings into their respective seats, the cover block having a valve controlled port therethrough for admitting liquid from the reserve chamber to the chamber formed within the casing, and the said partition being provided with a valve-controlled port for regulating the flow of liquid from one side of the partition to the other.

4. A shock absorber comprising a casing having a cylindrical chamber, a shaft journaled in the bottom of said casing, a vane on said shaft, a partition extending between said shaft and the said casing, the said partition having a port therethrough elongated in the direction of the length of said chamber and provided with a cylindrical bore extending inwardly from the outer face thereof and intersecting said port and having a reduced threaded extension, a cover block for said casing, the said cover block having a central bearing for said shaft and being provided with a bore registering with the bore of said partition, a valve having a threaded inner end adapted to be received in the extension of the first mentioned bore and provided with a cylindrical body adapted to fit the first mentioned bore and to cover the port more or less by its movement in such bore, the said valve having a stem within the bore provided therefor in the cover block, and packing material surrounding the said stem in the last mentioned bore.

5. A shock absorber comprising a casing having a cylindrical chamber, a shaft journaled in the bottom of said casing, a vane on said shaft, a partition extending between said shaft and the said casing, the said partition having a port therethrough elongated in the direction of the length of said chamber and provided with a cylindrical bore extending inwardly from the outer face thereof and intersecting said port and having a reduced threaded extension, a cover block for said chamber secured to said casing, the said cover block having a central bearing for said shaft and being provided with a bore registering with the bore of said partition, a valve having a threaded inner end adapted to be received in the extension of the first mentioned bore and provided with a cylindrical body adapted to fit the first mentioned bore and to cover the port more or less by a movement in said bore, the said valve having a stem within the bore provided therefor in the cover block, and packing in said bore for said stem, the said packing comprising an inner gland seated in said bore and surrounding the said stem, a compressible packing ring also surrounding the said stem and engaging the outer face of said gland, and a block threaded in the outer end of the bore and surrounding the outer end of the stem and serving to compress the packing ring between the inner face thereof and the outer face of said gland.

6. A shock absorber comprising a casing having a cylindrical chamber, a shaft journaled in the bottom of said casing, a vane on said shaft, and a partition extending between said shaft and the said casing, the said partition having a port therethrough, a cover block for said chamber secured to said casing, the said cover block having a central bearing for said shaft and being provided with a bore, a valve comprising a body adapted and arranged to cover the port more or less by its movement, the said valve having a stem within the bore provided therefor in the cover block, and packing in said bore for said stem, the said packing comprising an inner gland seated in said bore and surrounding the said stem, a compressible packing ring also surrounding the said stem and engaging the outer face of said gland, and a block threaded in the outer end of the bore and surrounding the outer end of the stem and serving to compress the packing ring between the inner face thereof and the outer face of said gland.

7. A shock absorber comprising a casing having a cylindrical chamber therein, a shaft journaled in the bottom of said casing and extending therethrough, a vane on said shaft, a partition opposed to said vane and extending between the shaft and the inner cylindrical wall of said casing, said partition having a port therethrough and a bore extending inwardly from the outer end thereof and intersecting said port, a cover block secured to the outer face of said casing and having a journal in the central portion thereof for said shaft, a cover extending from the said block and forming therewith a reserve chamber, the said cover having in its central portion a journal for the said shaft, the cover block having a bore therethrough registering with the first mentioned bore, a valve threaded into the partition and having a cylindrical portion fitting the first mentioned bore and adapted to cover more or less the port in said partition, said valve having a stem extending through the bore provided therefor in the cover block, packing in the last mentioned bore surrounding the valve stem, the cover for the reserve chamber having an opening in alignment with the outer end of said valve stem, and a plug removably closing the said opening.

8. A shock absorber comprising a casing having a cylindrical chamber therein, a shaft journaled in the bottom of said casing and extending through said casing, a vane on said shaft in said casing, a partition in said casing extending between the said shaft and the inner wall of the casing, the said partition having a valve-controlled port therethrough for permitting the flow of liquid from one side to the other of the said partition, a cover block for the chamber having a central bearing for the said shaft and provided with an annular shoulder adjacent to said casing, the said casing having an annular seat in the outer face thereof surrounding the outer end of the cylindrical wall therein, and a flange surrounding said seat and having its outer end bent into engagement with the shoulder on said cover block.

9. A shock absorber comprising a casing having a cylindrical chamber therein, a shaft having one end journaled in the bottom of said casing and extending through said casing, a vane on said shaft, a partition extending between the said shaft and the inner cylindrical wall of said casing, the said partition having a port extending therethrough and being provided with a bore intersecting said port, a valve mounted in said bore and adapted by its adjustment to vary the effective cross sectional area of said port, the said valve having a stem projecting rearwardly from said port, a cover block for said casing having a bore for said stem and packing surrounding the said stem and also having a central bearing for the said shaft, said cover block having a port extending through the upper portion thereof and communicating at its inner end with the chamber in the casing and also having a port extending through the lower portion thereof and communicating at its inner end with the chamber in said casing and being provided with a check valve opening toward said casing, and a cover shell extending rearwardly from the said block and forming a reserve chamber therewith with which the outer ends of the second and third ports communicate and being provided with a central bearing for said shaft.

10. A shock absorber comprising a cylindrical liquid-containing casing, a shaft journaled in said casing, a cover for said casing through which the said shaft extends and forming a working chamber, a vane on said shaft in said working chamber and a valve mounting in said working chamber, the said mounting comprising a V-shaped partition having a cylindrical surface at its inner end adapted to form a bearing with the portion of the shaft within the working chamber and a pair of legs extending from opposite ends of said surface to the inner cylindrical wall of said casing, each of said legs being provided with a port therethrough, a check valve controlling the port in one of said legs and adapted to permit the free flow of liquid therethrough from the other port by movement of the vane in one direction, the leg carrying the valve-controlled port having also another port therethrough, and a valve for controlling the effective cross sectional area of the last mentioned port.

11. A shock absorber comprising a casing having a cylindrical chamber therein, a shaft having one end journaled in the bottom of said casing and extending through said casing, a vane on said shaft, a partition wall extending between the said shaft and the inner cylindrical wall of said casing, the said partition wall having a port therethrough, a valve mounted in said wall and controlling said port, a cover block for said casing having a central bearing for the said shaft, a cover shell projecting rearwardly of the cover block and forming a reserve chamber therewith and provided with a central bearing for the said shaft, the said cover block having an aperture through the upper portion thereof communicating with the chamber in the casing and the reserve chamber, said cover block also having a port in the lower portion thereof extending therethrough and communicating at its ends with the aforesaid chambers, and a check valve in the last mentioned port.

12. A shock absorber comprising a casing having a cylindrical chamber, a cover for said chamber, a shaft having one end journaled in the bottom of said casing and extending through said cover, a vane on said shaft in said chamber, a V-shaped partition extending between said shaft and the inner cylindrical wall of said casing, one wall of said partition having a port therethrough and the other wall being provided with a valve controlled port and a second port provided with a check valve, and a cover shell secured to said casing and forming a reserve chamber beyond the cover, the said shell having a bearing through which the shaft projects, the cover having an aperture through the upper portion thereof for the passage of air and also having a valve controlled aperture in the lower portion thereof for the passage of liquid from the reserve chamber to the working chamber.

In testimony whereof, I hereunto affix my signature.

RICHARD J. DICKEY.